N. P. BOWSHER.
Rolling-Colter for Plows.
No. 219,680. Patented Sept. 16, 1879.
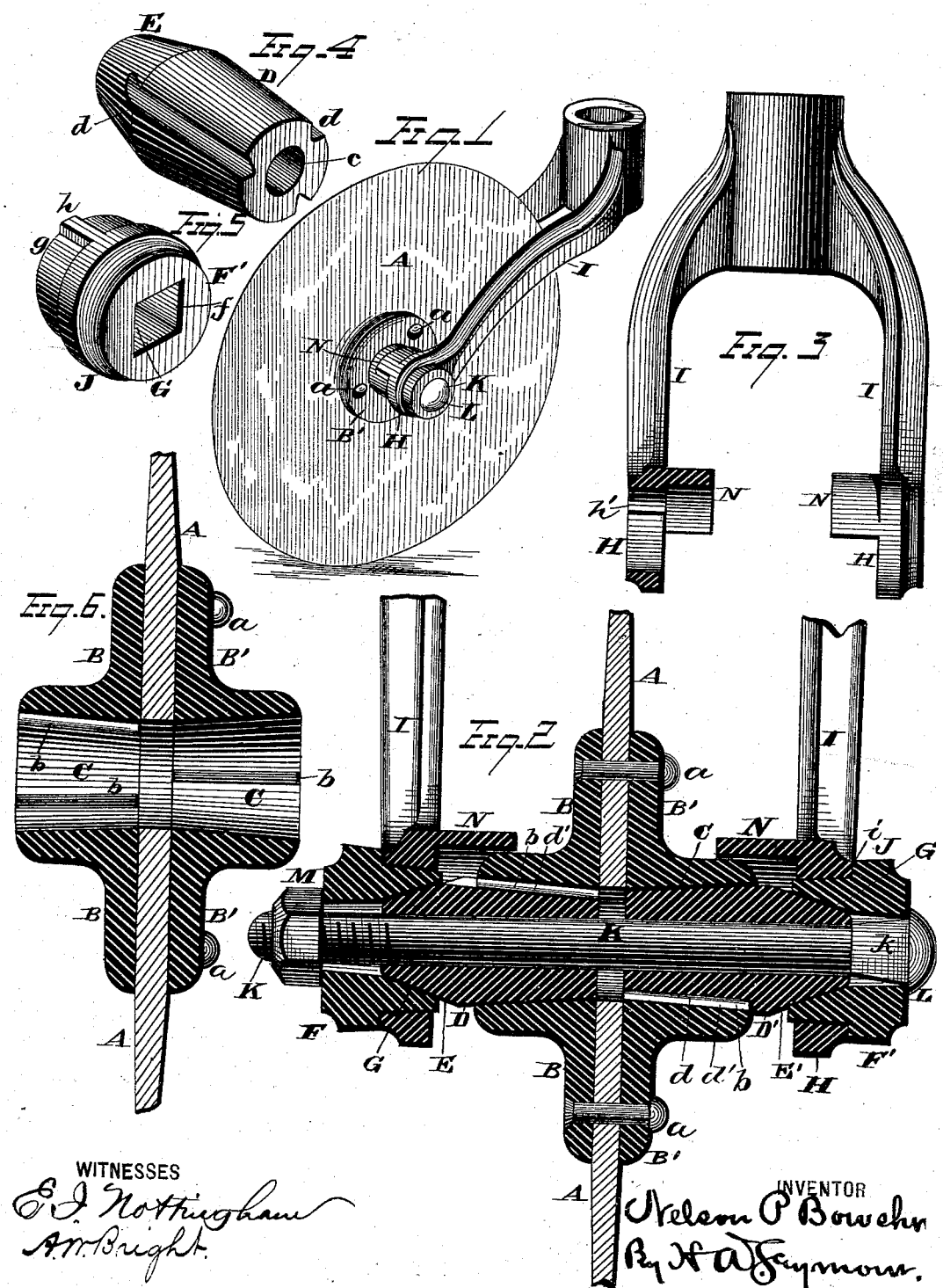

UNITED STATES PATENT OFFICE.

NELSON P. BOWSHER, OF SOUTH BEND, INDIANA, ASSIGNOR TO THE SOUTH BEND IRON WORKS, OF SAME PLACE.

IMPROVEMENT IN ROLLING COLTERS FOR PLOWS.

Specification forming part of Letters Patent No. 219,680, dated September 16, 1879; application filed August 9, 1879.

*To all whom it may concern:*

Be it known that I, NELSON P. BOWSHER, of South Bend, in the county of St. Joseph and State of Indiana, have invented certain new and useful Improvements in Rolling Colters for Plows; and I do hereby declare the following to be a full, clear, and exact description of the invention, such as will enable others skilled in the art to which it pertains to make and use it, reference being had to the accompanying drawings, which form part of this specification.

My invention relates to an improvement in revolving plow-colters, the object being to provide a rolling plow-colter of such construction that the journals and bearings may be readily adjusted to compensate for wear, and either the journals or bearings adapted to be readily removed when unduly worn, and replaced by new bearings or journals.

My invention consists, first, in a revolving plow-colter provided with renewable journals having conical or tapered ends and renewable journal-bearings constructed with conical or tapered recesses, whereby either or both the journals and bearings may be removed and renewed when impaired by wear.

My invention further consists in the combination, in a revolving plow-colter, of hollow journals having conical or tapered ends detachably secured to hubs attached to the colter-blade, and renewable bearings provided with conical or tapered recesses, with an axle or tightening bolt extending through said journals and bearings, and adapted to take up any wear of such parts.

My invention further consists in the combination, in a revolving colter, of the colter-blade provided with hubs furnished with longitudinal splines or fins on the inner surfaces thereof with removable journals having conical or tapered ends, and furnished with longitudinal grooves, which receive the splines of the hubs and prevent the journals from becoming displaced within the hubs.

My invention further consists in the combination, in a revolving plow-colter, of a colter-blade having hubs secured to the opposite sides of its center with detachable journals having conical or tapered wearing ends, and the opposite ends grooved and tapered for firmly securing said journals within the hubs of the colter-blade.

My invention further consists in the combination, in a revolving plow-colter, of the colter-blade and detachable journals secured within hubs attached to the blade with renewable bearings having conical or tapered recesses, and collars on their outer ends which rest against the outer surfaces of the yoke within which the colter is journaled.

In the accompanying drawings, Figure 1 is a view, in perspective, of my improved revolving plow-colter. Fig. 2 is a vertical transverse section of the same. Fig. 3 is an enlarged view of the yoke, one of the arms of which is shown in section. Fig. 4 is an enlarged view of one of the renewable journals. Fig. 5 is an enlarged view of one of the renewable bearings; and Fig. 6 is an enlarged view in longitudinal section of the hubs attached to the colter-blade.

A represents the colter-blade. B B' are hubs, secured to opposite sides of the colter-blade by bolts or rivets $a$. Hubs B B' are of sufficient diameter on their inner ends to be firmly secured to the colter-blade and prevent the latter from bending or buckling when in use, while the outer ends of the hubs are contracted in diameter, and cast with journal-sockets C therein, said sockets extending transversely through said hubs.

Sockets C are preferably made slightly tapering from their inner to their outer ends, as will be observed in the drawings, the diameter at the outer end of the socket-opening being slightly greater than the diameter of the inner portion thereof. Journal-sockets C are provided with any desired number of splines or ribs $b$, which extend the entire distance of the socket-opening.

D D' represent renewable journals, each of which is made with a central tubular opening, $c$, extending through its entire length. Renewable journals D D' are each formed with a slightly tapered inner end, $d$, having longitudinal grooves $d'$ formed therein, which grooves receive the corresponding splines or ribs $b$ in the hubs. Thus, when the renewable journals are inserted in their sockets and forced toward each other they will be firmly held in place, the tapered sockets affording a tight and snug bearing, and the splines and grooves preventing any possible rotary displacement of the journals. The outer ends, E E', of the renewable journals D D' are formed conical or tapered, and provided with smooth and hard wearing-surfaces.

Renewable journals D D' may be formed of cast-steel, cast-iron, or any suitable alloy. Preferably they are constructed of cast-iron, and provided with a case-hardened surface on their tapered outer ends, though they may be cast in a chill, and thus have a chilled wearing-surface, which will insure good results.

By providing the colter-blade with renewable journals, I am enabled to insure the desired length of axle to the colter-blade, and thus secure sufficient leverage to retain the colter-blade in a firm vertical position.

Although many forms of compensating bearings for revolving plow-colters have heretofore been constructed, no provision has been made for insuring the proper length of axle for the colter-blade. In several forms of construction the colter-blade has been provided with tapering bosses, which are made to serve as journals, and although should such bosses be of the proper length when first manufactured, after being used they are worn away and the axle unduly shortened, so that the blade will twist and run unevenly when subjected to hard usage. Also, such bosses have been provided with conical recesses in their outer ends; but such latter construction is open to the same objection, as they are continually being worn away and the length of the axle of the colter-blade shortened and its effectiveness impaired.

In my improvement, while I secure all the advantages of a compensating bearing, as will be hereinafter set forth, a further advantage is secured in that the relative and desired leverage of colter-blade axle may be insured by simply renewing the removable journals when worn.

As the renewable journals are of comparatively light weight and readily cast in the desired form, they are furnished at a small initial cost, and thus the journals may be renewed at a very slight expense.

F F' are renewable bearings, and are provided with conical or tapering recesses G on their inner ends, said conical recess in each bearing merging into a square bolt-hole, *f*, in the outer face thereof. Conical or tapered recesses G are of the proper form and size to receive the conical or tapered ends of the renewable journals D D'.

A portion, *g*, of the periphery of the renewable bearing G is provided with a spline, *h*, which fits in a corresponding groove, *h'*, in the eye H of the yoke-arm I, and thus the bearings are prevented from turning within their sockets in the yoke-arm. The outer end of each bearing is provided with a collar or enlargement, J, to constitute an annular seat, *i*, which bears against the outer surface of the yoke-arm.

Renewable bearings F F' are inserted in place from the outer side of the yoke-arms. This feature of construction is of importance for the following reason: It is desirable, as has heretofore been observed, to provide as long an axle-bearing for the colter-blade as can be admitted between the yoke-arms. When the renewable bearings are inserted in pockets formed on the inner faces of the yoke-arms, the colter-axle is necessarily reduced somewhat in length to allow of the insertion of such bearings; but in my improvement the axle may be equal in length to the distance between the yoke-arms, for the reason that the renewable bearings, being inserted from the outside, do not prevent the employment of an axle of the greatest length possible to be inserted between the arms of the yoke.

K is a tightening-bolt, and is provided with a squared portion, *k*, near the head L, said squared portion fitting with the square opening in the renewable bearing, and thereby preventing the bolt from turning. Bolt K extends through the renewable bearings and journals, and is furnished with a nut, M, by means of which the bearings may be drawn snugly against their journals when either of said parts become worn.

The yoke-arms are each provided at their lower ends with a dirt-guard, N, which is of sufficient width to cover the renewable journals and bearings, and thereby prevent dirt from entering between the wearing-surfaces thereof.

Having fully described my invention, what I claim as new, and desire to secure by Letters Patent, is—

1. In a revolving plow-colter, the combination, with the colter-blade provided with renewable journals having conical or tapered ends, of renewable bearings formed with conical or tapered recesses, substantially as set forth.

2. In a revolving plow-colter, the combination of the colter-blade, the renewable journals having conical or tapered ends, the renewable bearings formed with conical or tapering recesses, the tightening bolt or axle, and the yoke-arms, substantially as set forth.

3. In a revolving plow-colter, the combination, with the colter-blade provided with hubs on opposite sides of its center, said hubs being furnished with longitudinal splines or ribs, of removable journals having conical or tapered ends and furnished with longitudinal grooves, which latter receive the splines of the hubs, substantially as set forth.

4. In a revolving plow-colter, the combination, with the colter-blade provided with hubs on opposite sides of its center, said hubs made tapering and furnished with longitudinal splines or ribs, of removable journals having conical or tapered wearing-ends and tapered inner ends or shanks having longitudinal grooves in the surfaces thereof, substantially as set forth.

5. In a revolving plow-colter, the combination, with detachable journals secured within hubs attached to the colter-blade, of renewable bearings having conical or tapered recesses for the journals, said bearings provided with collars on their outer ends, which rest against the outer surfaces of the arms of the yoke, substantially as set forth.

In testimony that I claim the foregoing I have hereunto set my hand this 4th day of August, 1879.

NELSON P. BOWSHER.

Witnesses:
LUCIUS HUBBARD,
R. J. CHESNUTWOOD.